United States Patent [19]

Holub et al.

[11] 3,717,615

[45] Feb. 20, 1973

[54] POLYIMIDES

[75] Inventors: Fred F. Holub, Schenectady; Denis R. Pauze, Scotia, both of N.Y.

[73] Assignee: General Electric Company

[22] Filed: April 25, 1969

[21] Appl. No.: 819,445

[52] U.S. Cl.......260/78 UA, 117/161 P, 204/159.22, 260/18 N, 260/47 CZ, 260/47 UA, 260/65, 260/824 R, 260/844, 260/857 PA, 260/873, 260/874, 260/896, 260/897 B
[51] Int. Cl. ............................................C08g 20/20
[58] Field of Search.............260/78, 78 U, 47 CZ, 65

[56] References Cited

UNITED STATES PATENTS

| 2,743,260 | 4/1956 | Tawney | 260/78 |
| 2,818,405 | 12/1957 | Kovacic | 260/78 |
| 3,137,678 | 6/1964 | Jousset | 260/78 |
| 3,352,832 | 11/1967 | Barr et al. | 260/78 |
| 3,380,964 | 4/1968 | Grondschober et al. | 260/78 |
| 3,406,148 | 10/1968 | Sambeth et al. | 260/78 |

FOREIGN PATENTS OR APPLICATIONS

| 951,025 | 3/1964 | Great Britain | 260/78 |

Primary Examiner—Harold D. Anderson
Attorney—Paul A. Frank, Charles T. Watts, William A. Teoli, Joseph T. Cohen, Frank L. Neuhauser, Oscar B. Waddell and Joseph B. Forman

[57] ABSTRACT

Improved products are obtained from the polymerization of mixtures of mono-imides and bis-imides. The compositions thus obtained have improved physical properties and heat resistance making them especially suitable in various coating, insulating and molding applications.

29 Claims, No Drawings

POLYIMIDES

This invention is concerned with improved polyimides. More particularly the invention relates to a composition of matter comprising (1) a mono-imide (hereinafter so identified) composition of the general formula I
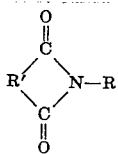

and (2) an imide selected from the class consisting of (a) an imide of the general formula II
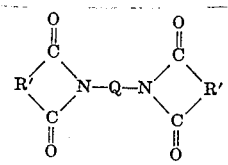

(b) an imide reaction product obtained by the reaction of ingredients in the molar ratio of at least 1 mol of an imide of formula II (e.g., from 1 to 4 mols) per mol of a diamino compound of the general formula III $\quad NH_2—Q—NH_2$ and (c) mixtures of (a) and (b), where R is a member of the class consisting of hydrogen, organic radicals (e.g., monovalent hydrocarbon radicals, halogenated organic radicals, etc.) and the IV
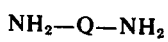

radical, R'' is a divalent hydrocarbon radical of from one to 12 carbon atoms, R''' is a monovalent hydrocarbon radical of from one to 10 carbon atoms, R' is a member selected from the class consisting of the V
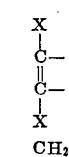

VI
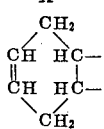

and

VII
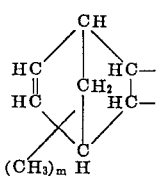

groupings, and halogenated, e.g., chlorinated derivatives of formulas VI and VII, containing up to six or more halogens, Q is a member selected from the class consisting of divalent organic radicals of at least two carbon atoms (both halogenated and unhalogenated) including but not limited to, e.g., divalent hydrocarbon radicals of up to 40 carbon atoms, and divalent groups consisting of two aryl residues attached to each other through the medium of a member selected from the class consisting of an alkylene radical of from one to 10 carbon atoms, —S—, —SO$_2$—,

and —O—, etc., X is a member of the class consisting of hydrogen, halogen, and the methyl radical, and $m$ is 0 or 1, and the methyl group in formula VII can be present in place of any one hydrogen of the monohydrogen - substituted carbons. It should understood that Q in Formulas II and III may be the same or different.

The polymerization of maleimide either with heat or with both heat and peroxide is described in U.S. Pat. No. 3,137,678, issued June 16, 1964. It has also been found that N-substituted maleimides can be polymerized with either heat alone or with heat in the presence of organic peroxides, to give useful polymeric compositions. However, when such N-substituted maleimides are polymerized by the above means, it has been found that the flexural strength of such products does not measure up to the standards which are desirable or even required in numerous applications. In addition, it has been found that though the polymerization of such N-substituted maleimides yields products having acceptable heat resistance and heat distortion temperatures, it would be desirable, if possible, to improve these particular properties.

Unexpectedly we have discovered that the flexural strength, flexibility, heat resistance, and heat distortion temperatures of polymers of N-substituted imides of Formula I can be measurably improved by the incorporation therein of effective amounts of a bis-imide hereinbefore described, and thereafter heat-curing the mixture in the presence or absence of sources of free radicals, irradiation with high energy electrons, or other equivalent agents to give infusible, insoluble (e.g., in methylene chloride) products. In general we have found that the proportion of the bis-imide which is incorporated in the mono-imide can be varied widely and can range, on a weight basis, from 5 to 95 percent of the total weight of the mono-imide and the bis-imide. The incorporation of amounts below 5 percent of the bis-imide effects measurable improvements in the flexural strength of the polymerized mono-imide.

Among the members which R in formula I may represent are, for instance, hydrogen, monovalent hydrocarbon radicals, for instance, alkyl (e.g., methyl, ethyl, propyl, isopropyl, butyl, decyl, dodecyl, etc.) aryl (e.g., phenyl, dichlorophenyl, pentabromobiphenyl, tolyl, ethylphenyl, naphthyl, anthracyl, etc.); aralkyl (e.g., benzyl, phenylethyl, phenylpropyl, etc.); unsaturated aliphatic including unsaturated cycloaliphatic (e.g., vinyl, allyl, methallyl, isobutylenyl, crotonyl, cyclopentyl, cyclopentenyl, cyclohexyl, cyclohexenyl, ethynyl, propynyl, etc.), tolyl, ethylphenyl, etc.

Included among the mono-imide compositions of formula I are, for instance, maleimide, N-methyl maleimide, N-ethyl maleimide, N-phenyl maleimide hereinafter referred to as "PMI", N-n-butyl maleimide, N-o-tolyl maleimide, N-o-biphenyl maleimide, N-monochlorophenyl-maleimide, N-vinyl maleimide, N-allyl maleimide, N-cyclohexyl maleimide, N-decyl maleimide, N-propynyl maleimide, etc. It will of course be understood that in addition to maleimide and N-substituted maleimides, methyl-substituted mono-imides and halogenated mono-imides can also be employed where the halogen, for example, chlorine, bromine, fluorine, etc., can range in number from one to four or more halogens on the carbon atoms adjacent to the carbonyl groups or contained within the structure of the mono-imide.

The aforesaid class of mono-imides can be prepared quite readily. For example, maleimide or a substituted maleimide, for instance, a mono-imide containing chlorine or a methyl radical on the carbon atom, may be prepared by reacting the appropriate anhydride of the dicarboxylic acid with the appropriate amine to form the monoamide of the acid and subsequently splitting off water from the monoamide. For example, in preparing N-phenyl maleimide, maleic anhydride is interacted as above with aniline and then with acetic anhydride and sodium acetate (to effect imidization) to give the desired N-phenyl maleimide. Similarly, the other N-substituted mono-imides can be prepared by employing the appropriate amine for the purpose with the maleic anhydride or other equivalent anhydride incorporating the desired R' radical of Formula I (the same applies to the use of the R' radical for making bis-imides), e.g., citraconic anhydride, itaconic anhydride, tetrahydrophthalic anhydride, endomethylenetetrahydrophthalic anhydride (hereinafter referred to as "nadic anhydride"; also known as endo-cis-5-norbornene-2,3-dicarboxylic anhydride), methyl-substituted and halogen-substituted nadic anhydride, for instance, hexachloroendomethylenetetrahydrophthalic anhydride, etc.

In addition to the above-described N-substituted mono-imides, N-substituted mono-imides can be used where R corresponds to formula IV. Representative of R''' as a monovalent hydrocarbon radical are the many examples of such monovalent hydrocarbon radicals given for R above. Among the divalent hydrocarbon radicals which R'' may represent are, for instance, preferably saturated alkylene radicals of from one to 12 carbon atoms (e.g., methylene, ethylene, isopropylidene, hexamethylene, decylene, etc.), divalent arylene radicals, for example, phenylene, ethylphenylene, naphthylene, etc., radicals. Included among such organosilyl-containing mono-imides may be mentioned, for instance, N-(trimethylsilylphenylene) maleimide, N-(dimethylphenylsilylethylene) maleimide, N-triphenylsilyl tetrahydrophthalimide, etc. Again these compositions may be prepared by reacting, for instance, maleic anhydride, methyl-substituted maleic anhydride or halogenated maleic anhydride with the appropriate amino triorganosilyl compound of the formula

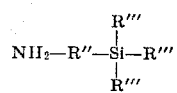

where R'' and R''' have the meanings above. Again silylated derivatives of such compositions desired from itaconic, citraconic and tetrahydrophthalic anhydrides, in place of maleic anhydride may also be used in the practice of the present invention without departing from the scope thereof.

The bis-imides of the general formula II can be varied widely depending on the kinds of organic radicals which are present therein. Among the divalent groupings which Q may broadly and more specifically represent are, for instance, divalent saturated alkylene radicals of up to 40 carbon atoms, for instance one to 10 (e.g., ethylene, propylene, butylene, isopropylidene, hexylene, cyclohexylene, etc.), the divalent radical of diethylene oxide of the formula —CH$_2$—CH$_2$—O—CH$_2$—CH$_2$— etc.); arylene (e.g., m-phenylene, p-phenylene, p,p'-biphenylene, dichlorophenylene, biphenylene methylene of the formula

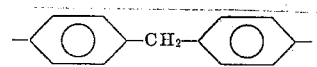

biphenylene oxide, biphenylene sulfone, biphenylene sulfide, keto biphenylene of the formula

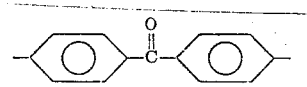

, etc.) etc. Obviously, the arylene radicals may be attached to nitrogen through the ortho, meta or para positions.

Typical examples of the bis-imides which may be employed with the mono-imides or to make the reaction product with the diamino compound of Formula III are, for instance, N,N'-ethylene-bis-maleimide, N,N'-m-phenylene-bis-maleimide, N,N'-p-phenylene-bis-maleimide, N,N'-hexamethylene-bis-maleimide, N,N'-p,p'-diphenyldimethylsilyl-bis-maleimide, N,N'-p,p'-diphenylmethane-bis-maleimide (hereafter referred to as "BMI"), N,N'-p,p'-diphenylether-bis-maleimide, N,N'-p,p'-diphenylthioether-bis-maleimide, N,N'-diphenylsulfone-bis-maleimide, N,N'-dicyclohexylmethane-bis-maleimide, N,N'-m-xylylene-bis-maleimide, N,N'-p,p'-benzophenone-bis-maleimide, N,N'-(3,3'-dichloro-p,p'-biphenylene) bis-maleimide, N,N'-p,p'-diphenyl ether-bis-endomethylenetetrahydrophthalimide, N,N'-p,p' -diphenylmethane-bis-tetrahydrophthalimide, etc. Halogenated derivatives of such bis-imides where halogen is on the anhydride portion of the imide and on an aryl nucleus can also be employed without departing from the scope of the invention, e.g., N,N'-(3,3'-dichloro-4,4'-biphenyloxy)-bis-maleimide, N,N'-(3,3'-dibromo-4,4'-diphenylmethane) bis-dichloromaleimide, N,N'-4,4'-diphenylmethane-bis-hexachloroendomethylenetetrahydrophthalimide, etc.

Bis-imides which are especially suitable in the practice of the present invention are those corresponding to the general formula

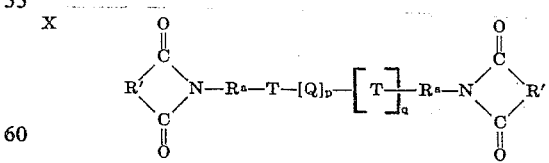

where $R^a$ is a divalent alkylene radical of from one to 10 carbon atoms or an arylene radical of from six to 20 carbon atoms, preferably selected from the class consisting of the arylene (e.g., phenylene) and hydrocarbon-substituted arylene (e.g., phenylene) radicals, e.g., alkyl-substituted phenylene radicals (e.g., methyl, ethyl, propyl, etc., substituted phenylene radicals) and aryl substituted (e.g., phenyl, tolyl, etc., substituted phenylene radicals) arylene radicals, where the number of substituents on the arylene radical may range from one to four, where R' has the meaning given above, T is a member of the class of groupings selected from $$-O-\overset{O}{\underset{\|}{C}}-,\ -\overset{O}{\underset{\|}{C}}-O-,\ -\overset{O}{\underset{\|}{C}}-NH-,\ -O-\overset{O}{\underset{\|}{C}}-O-,\ \text{and}\ -O-\overset{O}{\underset{\|}{C}}-N-$$

and Q is a divalent organic radical of at least two to as high as 50 or more carbon atoms, preferably selected from the class consisting of aromatic, aliphatic, cycloaliphatic, heterocyclic, combinations of aliphatic and aromatic radicals, and substituted hydrocarbon groups thereof, among which may be mentioned phenylene radicals containing from six to 12 carbon atoms and the XI    $-R^b-Z-R^b-$ radical where $R^b$ is phenylene and alkyl-substituted phenylene radicals and Z is a divalent grouping of the alkylene class and $-S-$, $-SO_2-$, $$-\overset{O}{\underset{\|}{C}}-$$

and $-O-$, X is a member selected from the class consisting of hydrogen, halogen and the methyl radical, and $p$ and $q$ are the same and are 0 or 1, R' is the same as in Formula I. Typical of bis-imides coming within the scope of Formula X are those having the formulas XII, XIII, XIV, XV, XVI [structural formulas]

Compositions corresponding to the general formula X and methods for preparing the same are disclosed and claimed in the copending application of Fred F. Holub and Carl M. Emerick, Ser. No. 819,430 filed concurrently herewith and assigned to the same assignee as the present invention. By reference, the disclosures of this latter application are made part of the disclosures of the instant application.

The above bis-imides of Formula II can be prepared by reacting two moles of maleic anhydride (or other anhydride required for making the bis-imides of Formula II) with 1 mole of a suitable diamino compound. Mixtures of anhydrides can be used if desired. Typical of the diamino compound which may be employed for making the bis-imides of Formula II or for making the reaction product between a diamino compound of Formula III and the bis-imides of Formula II may be mentioned, for instance, meta-phenylene diamine; para-phenylene diamine; 4,4'-diamino-3,5,3',5'-tetramethyl-diphenyl methane, 4,4'-diamino-diphenyl propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 4,4'-diamino-3,5,3',5'-tetrachloro-diphenyl methane, 2,6-diamino-pyridine; bis-(4-aminophenyl)diethyl silane; bis-(4-amino-phenyl)phosphine oxide; bis-(4-aminophenyl)-N-methylamine; 1,5-diamino-naphthalene; 3,3'-dimethyl-4,4'-diamino-biphenyl; 3,3'-dimethoxy benzidine; 2,4-bis-(beta-amino-t-butyl) toluene; bis-(para-beta-amino-t-butylphenyl) ether; para-bis-(2-methyl-4-amino-pentyl)benzene; para-bis-(1,1-dimethyl-5-amino-pentyl) benzene; m-xylylene diamino; p-xylylene diamine; bis(para-amino-cyclohexyl) methane; hexamethylene diamine; heptamethylene diamine; octamethylene diamine; nonamethylene diamine; decamethylene diamine; 3-methylheptamethylene diamine; 4,4-dimethylhepta-methylene diamine; 2,11-diamino-docecane; 1,2-bis-(3-amino-propoxy) ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane; $H_2N(CH_2)_3O(CH_2)_2O(CH_2)_3NH_2$; $H_2N(CH_2)_3S(CH_2)_3NH_2$; $H_2N(CH_2)_3N(CH_3)(CH_2)_3NH_2$; and mixtures thereof.

In addition to the mono-imide and the bis-imide having radicals where the R' is a grouping of the Formula V, R' can also be either the grouping

[structural formula]

or the grouping

[structural formula]

and or halogenated derivatives thereof, where $m$ is 0 or 1. In general the presence of groupings VI and VII, or halogenated derivatives thereof can be obtained by reacting maleic anhydride with, for instance, butadiene, pentadiene, cyclopentadiene (including methyl-substituted cyclopentadiene), or halogenated derivatives thereof, by means of a Diels-Alder reaction before interaction of the latter maleic anhydride derivative with the monoamine compound or the diamino compound to form the appropriate mono-imide or bis-imide.

We have found that in addition to using the mono-imide, or the bis-imide, or the reaction product of the bis-imide and the diamino compound of Formula III in the practice of the present invention, it is also possible to prepolymerize both the mono-imide and the bis-imide to a state of intermediate polymerization (short of the finally cured infusible and insoluble state) similar to the B-stage of phenol-formaldehyde resins. Thereafter, the prepolymerized products can be reacted either in the presence of heat alone or with an additional amount of an organic peroxide or other source of free radicals to give the finally cured, thermoset products. In particular, the use of such prepolymerized compositions is especially advantageous in connection with the polymerizations involving the mono-maleimides of Formula I. This is due to the fact that a number of these mono-imides have high vapor pressures and in certain applications, particularly in molding applications requiring a rapid conversion of the polymerizable composition to the finally cured state, elevated temperatures are required to attain this objective. The use of abrupt high temperature conditions tends to cause detrimental losses of some of the mono-imide. By converting the mono-imide to the prepolymerized product, this problem of undesirable volatilization (or sublimation as often is the case) can be obviated.

This problem with the mono-imide is not as serious when the mono-imide is employed in applications involving coating techniques, where the temperature used to convert the polymerizable mixture containing the mono-imide can begin at a relatively low temperature and can progress gradually upward. Under such conditions of heating, the mono-maleimide is caused to polymerize before reaching the temperatures at which undesirable volatilization or sublimation occurs. Thereafter, the final cure at the elevated temperatures does not encounter the problem of excessive loss of the mono-imide from the polymerizing mixture by virtue of its high vapor pressure.

Also, it may be desirable to prepolymerize the bis-imides, and this includes the reaction product of the bis-imides of Formula II with the diamino compound of Formula III. In addition, the mixture of the mono-imide and the bis-imide may be prepolymerized in contact with each other before use in applications. It has been unexpectedly found that by employing the prepolymerized products, it is possible to have shorter curing cycles by employing higher temperatures.

The preparation of the prepolymerized products can be carried out generally by heating the imide, whether it is the mono-imide or the bis-imide at elevated temperatures ranging from about 75° to 200° C., either with or without a source of free radicals, such as an organic peroxide, for periods of time ranging from a matter of from 10 to 30 seconds to as high as 1 to 2 hours or more, maintaining the conditions of prepolymerization so that there is obtained a higher molecular weight product than what was initially employed. These higher molecular weight products can vary from liquids to solids depending on the temperature. Generally at room temperatures (25°–30° C.) they are solids. The usual degree of polymerization which is desired is one where the problem of volatilization or sublimation no longer presents itself and the prepolymerized product has not reached the thermoset infusible and insoluble state. We have found that a useful end point of prepolymerization is where the prepolymerized product has a flow point, that is the material becomes molten and starts to fuse, at a temperature within the range of about 60° to about 250° C. This does not mean that lower or higher flow points may not be useful or are contemplated. It should be recognized that the degree of polymerization will vary with the starting maleimide, the temperature and time at which the prepolymerization reaction is carried out, the absence or presence of a polymerization moderator, and whether there is present or absent a free radical initiator and also the amount of such free radical initiator. When employing a free radical initiator for prepolymerization purposes, the same free radical initiators can be used as when effecting the final polymerization to the cured, that is, thermoset, infusible and insoluble state.

In order to maintain control over the degree of prepolymerization, it is often desirable to employ a polymerization moderator with the imide undergoing prepolymerization. These moderators are the usual ones which are employed for controlling the length of chains of polymers made from olefinic monomers. We have found that good control of prepolymerization that is molecular weight, degree of fusibility, etc., can be obtained by using in the prepolymerizing mixture a small amount of oleic acid. The amount of oleic acid which is used can be varied widely and as it increases the degree of prepolymerization will be lower and the reaction will proceed slower. Generally we may employ from about 0.01 to 2 percent of the polymerization moderator, such as the oleic acid, based on the weight of the imide or imides undergoing prepolymerization. In addition to the oleic acid one can also employ other moderators for the purpose, for instance, benzoquinone, linoleic acid, etc. The choice of moderator will depend on the unsaturated system being used; oleic acid, however, has been found to be acceptable in all systems tried.

For purposes of brevity and convenience, the term "mono-imide" and the term "bis-imide" (which is intended to include not only bis-imides of Formula II but reaction products of bis-imides of formula II with the diamino compound of Formula III) are also intended to include within their definition prepolymerized products derived therefrom. Thus, when referring to or describing any uses made of the mono-imides or the bis-imides, it is intended to include within the scope of such references, the prepolymerized products derived therefrom.

The copolymerization of the mono-imide (or mixture of mono-imides) with the bis-imide (or mixtures of bis-imides) may be carried out merely by heating at temperatures ranging from about 80° to 400° C. for the length of time required to obtain the desired copolymerization. Generally, temperatures of the order of 125° to 300° C. are adequate for the purpose. The incorporation of organic peroxides or other free radical producing polymerizing agents accelerates the rate of copolymerization. Among such organic peroxides may be mentioned dicumyl peroxide, benzoyl peroxide, dibenzoyl peroxide, tertiary butyl perbenzoate, cumene hydroperoxide, tertiary butyl hydroperoxide, 2,5-dimethyl-2,5-di(t-butylperoxy)-hexane, etc.; azo-bis-isobutyronitrile; etc. Generally the amount of cure accelerator employed for the purpose can range from about 0.01 to as high as 5 percent or more, by weight, based on the total weight of the mono-imide and the bis-imide.

It will be apparent to those skilled in the art that the copolymerization of the mono-imide and the bis-imide can be carried out in the presence of a solvent, for example, N-methyl-2-pyrrolidone, dimethylformamide, dimethylacetamide, etc. An important qualification when using the solvent is that it be inert to the reactants and it have a sufficiently high boiling point to maintain a high enough temperature at atmospheric pressure to effect the desired polymerization. The use of pressure conditions is not precluded thus permitting lower boiling solvents.

In addition to the copolymerization of the mono-imide and the bis-imide, other copolymerizable monomers containing at least one

grouping (e.g., from 1 to 3) may be employed in positive amounts ranging up to 50 percent or more, by weight, based on total weight of the mono-imide and bis-imide. Included among such vinyl monomers may be mentioned, for instance, vinyl chloride; isobutylene, butadiene, isoprene, chlorotri-fluoroethylene; 2-methylpentene-1; vinyl esters of organic carboxylic acid such as vinyl formate, vinyl acetate; acrylonitrile, styrene, vinyl methyl ether, vinyl methyl ketone; acrylic esters, such as methyl-, ethyl-, butyl-, etc., esters of acrylic and methacrylic acids, etc.; diallyl phthalate, divinyl benzene, triallyl citrate, triallyl cyanurate, N-vinyl phthalimide, N-allyl phthalimide, N-allyl tetrachlorophthalimide, etc.

The bis-imides prepared from the reaction of the bis-imide of Formula II and the diamino compound of the formula $H_2N-Q-NH_2$ where Q has the meaning given above can be made in a number of fashions. Advantageously, one can employ from about 1 to 4 moles of the bis-imide of Formula II for each mole of the diamino compound. Generally the reaction between the bis-imide of Formula II and the diamino compound of Formula III is advantageously carried out in a solvent such as dimethylformamide, N-methyl-2-pyrrolidone, etc. The temperature of the reaction is not critical and is favorably maintained within the range of from about 90° to 300° C. for times ranging from about 2 minutes to as high as several hours, depending on the temperature, ingredients used and molar ratio of the ingredients. If desired, the reaction product thus obtained from the bis-imide of Formula II can be additionally prepolymerized in the manner previously described.

It is equally possible to effect the reaction between the bis-imide of Formula II and the diamino compound by forming a mixture of the two ingredients without a solvent and heating them at the desired reaction temperature. In such circumstances, it would be necessary to effect intimate dispersion and mixing of the ingredients.

Typical of the methods for making the reaction products of the bis-imide of Formula II and the diamino compound of Formula III are the following examples where all parts are by weight. Thus, in one instance, a mixture of ingredients in a molar ratio of 1 mol of 4,4'-diaminodiphenylmethane (8.29 parts) and 1 mol of BMI (15 parts) was heated at a temperature of about 120° C. for approximately 1 hour to give the desired reaction product; while another product was prepared by effecting reaction between 48.24 parts BMI and 12 parts 4,4'-diaminodiphenyl) oxide for 35 minutes at a temperature of 195° C. and then for 1 hour at 195°–200° C. under reduced pressure to give the desired reaction product.

It will of course be apparent to those skilled in the art that other reaction products of a diamino compound and a bis-imide of Formula II can be obtained by varying the molar ratio of the reactants in each instance and employing similar conditions as recited above. The use of the same class of solvents as employed in connection with making the mono-imides is not precluded. More specific directions for making the reaction products of the bis-imides of Formula II with the diamino compound of Formula III may be found in French Patent 1,555,564 granted Dec. 23, 1968; by reference, this patent is made part of the disclosures of the instant application.

In addition to the foregoing ingredients, it is also possible to coreact at the same time that the copolymerization between the bis-imide and the mono-imide takes place, other polymers and resins in amounts ranging from about 1 to 75 percent or more, by weight, based on the total weight of the aforesaid two imides. Included among such polymers may be mentioned polyolefins (e.g., polyethylene, polypropylene, etc.) polystyrene, polyphenylene oxides such as shown in U.S. Pat. No. 3,306,875, epoxy resins such as shown in U.S. Pat. No. 2,840,540, polycarbonate resins such as shown in U.S. Pat. No. 3,028,365, silicone resins such as shown in U.S. Pat. No. 2,258,218-222, phenol-aldehyde resins, polyimide resins such as shown in U.S. Pat. No. 3,179,633-634, polyarylene polyethers such as shown in U.S. Pat. No. 3,332,909, etc., many of which are well-known and well-documented in the art.

In order that those skilled in the art may better understand how the present invention may be practiced, the following examples are given by way of illustration and not by way of limitation. All parts are by weight unless otherwise stated.

EXAMPLE 1

A series of copolymerizations were carried out employing PMI in combination with BMI in which the weights of the two ingredients were varied. To each formulation was added 1 percent, by weight, dicumyl peroxide, based on the total weight of the two maleimides. Each sample was then heated to a temperature within the range of 220°–270° C. over a period of about 2 hours to give heat-resistant infusible and insoluble films. The cut-through temperatures of the films obtained under the above-described polymerization conditions were determined in accordance with the method described in U.S. Pat. No. 2,936,296, issued May 10, 1960 and assigned to the same assignee as the present invention. The following table discloses the formulations employed together with the results of the cut-through tests.

TABLE I

| Sample No. | Parts PMI | Parts BMI | Cut-Through Temp.–°C. |
|---|---|---|---|
| 1 | 4.3 | 27 | 400 + |
| 2 | 3.5 | 11 | 400 + |
| 3 | 5.2 | 11 | 400 + |
| 4 | 5.2 | 7.2 | 400 + |
| 5 | 5.2 | 3.6 | 400 + |
| 6 | 10.0 | 0.0 | About 309 |
| 7 | 0.0 | 10.0 | Poor film-not self-supporting |

One of the unexpected discoveries of our invention involved finding that the heat stability of the mono-imide was materially improved when varying amounts of the bis-imide were incorporated, so that the final heat stability was very close to the heat stability of the polymerized bis-imide alone. This is important since the mono-imide is generally more available and less expensive than the bis-imide. Specifically it was found that the stability in air, i.e., the weight loss of the polymerized mono-imide when heated in air at elevated temperatures, was materially improved and in most instances was almost equivalent to the low losses encountered when the bis-imide alone was used. The following example shows the results of such tests.

EXAMPLE 2

In this example, varying amounts of PMI and BMI were mixed with one percent, by weight, of the two maleimides of dicumyl peroxide. Thereafter, the mixture of ingredients was cast on a substrate and heated slowly while raising the temperature to about 220° C. over a period of about 2 hours. Each thermoset film thus obtained was heated in air at a constantly increasing temperature of 4.5° C. per minute until it was determined at what temperature 10 weight percent of the polymerized product has been lost. This point in polymer loss was taken for all the formulations as is illustrated in the following table:

TABLE II

| Sample No. | Parts PMI | Parts BMI | Temperature at which 10% Weight Loss Occurred |
|---|---|---|---|
| 1 | - | 10.0 | 435°C. |
| 2 | 10.0 | - | 320°C. |
| 3 | 5.2 | 11.0 | 418°C. |
| 4 | 5.2 | 7.2 | 438°C. |
| 5 | 4.3 | 27.0 | 430°C. |
| 6 | 3.5 | 11.0 | 435°C. |
| 7 | 5.3 | 3.6 | 437°C. |

EXAMPLE 4

In this example 22.5 parts N-ethylmaleimide, 7.5 parts BMI, 70 parts of asbestos fibers, and 0.3 part benzoyl peroxide were milled at about 70° C. and thereafter the mixture was molded at 165° C. for 5 minutes at about 2,000 psi. The molded sample thus obtained was hard, infusible and insoluble. Samples of this molded product were tested and found to have a flexural strength of 3,690 psi and a flexural modulus of $1.27 \times 10^6$ psi.

EXAMPLE 5

In this example, 22.5 parts PMI, 7.5 parts BMI, 70 parts of asbestos fibers, and 0.3 part dicumyl peroxide were milled and pressed similarly as in Example 4 to yield a hard, substantially infusible and insoluble molded product. Portions of this molded product were tested and found to have a flexural strength of 9,130 psi and a flexural modulus of $2.03 \times 10^6$ psi. When the dicumyl peroxide was substituted with 0.3 part azobisisobutyro-nitrile and 0.08 part p,p'-diaminodiphenyl oxide added (for crosslinking purposes) and the mixture molded as above, the sample had a flexural strength of 5340 psi and a flexural modulus of $1.3 \times 10^6$ psi.

EXAMPLE 6

Fifteen parts PMI, 5 parts BMI, and 0.2 part dicumyl peroxide were mixed together and cast on a substrate and heated similarly as in Example 1 to give a hard, infusible and insoluble film. This film was tested and found to have a cut-through temperature of 375° C.

EXAMPLE 7

This example, illustrating the copolymerization of an olefinically unsaturated monomer with compositions of the present invention, was obtained by compounding together 15 parts PMI, 5 parts BMI, 2.2 parts styrene, and 0.3 part dicumyl peroxide. The sample was cast as a film and heated in the same fashion as in Example 1 to give a tough, infusible and insoluble film which upon testing was found to have a cut-through temperature of 400° C.

EXAMPLE 8

Employing the same conditions of milling and curing as in Example 1, 15 parts PMI, 5 parts BMI, 2.2 parts polystyrene, and 0.2 part dicumyl peroxide yielded a cured film which had a cut-through temperature of 400° C.

EXAMPLE 9

In this example, 15 parts PMI, 5 parts BMI, 2.2 parts of a poly-(2,6-xylylene) oxide polymer having a molecular weight above 20,000 and a intrinsic viscosity of about 0.49 (prepared from 2,6-xylenol in accordance with the disclosures of Hay U.S. Pat. No. 3,306,875, issued Feb. 28, 2967, and assigned to the same assignee as the present invention) and 0.2 part dicumyl peroxide were milled and cast into a film and cured similarly as in Example 1 to yield a thermoset, infusible, insoluble film having a cut-through temperature of 375° C.

EXAMPLE 10

About 5.2 parts PMI and 11 parts BMI were compounded similarly as in Example 1 and then heated for 21 minutes at 100° C. to give a clear tacky film. This film was irradiated with high energy electrons to a dose of $2 \times 10^8$ rad. (using a high voltage apparatus with a peak voltage of 800 KVP), to give an infusible and insoluble stiff film having good cut-through characteristics.

EXAMPLE 11

A bis-imide was prepared by reacting 5 mols BMI with 2 mols of p,p'-diamino diphenylmethane at 160° C. for about 25 minutes to give a bis-imide which is believed to be composed of compositions having within their scope structures such as

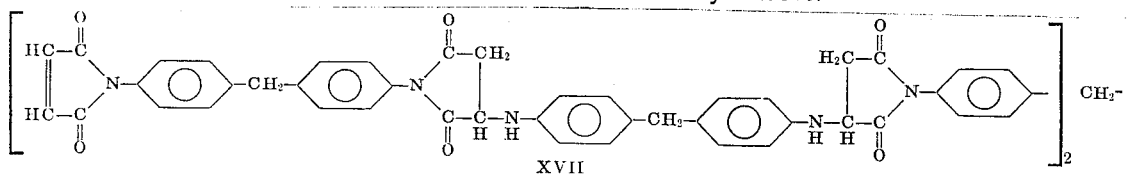

XVII and

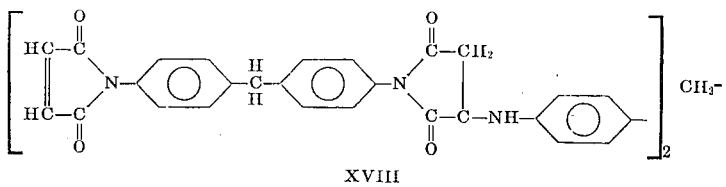

XVIII alone or further reaction products with the diamino compound or with the bis-maleimides. Fifteen parts of this bis-imide were milled with 15 parts PMI, 70 parts of asbestos fibers, and 0.3 part dicumyl peroxide and then molded at 165° C. for 5 minutes at 2,000 psi. This yielded a hard, infusible and insoluble product which had a flexural strength of 3,700 psi. When the filler was omitted and a film cast on a substrate and heated similarly as in Example, it gave a thermoset film having a cut-through of 320° C.

EXAMPLE 12

In this example, 22.5 parts PMI was compounded with 7.5 parts of various bis-imides, 0.3 part dicumyl peroxide and 70 parts asbestos fibers, molded and the flexural strengths of the insoluble infusible molded products determined. The compounding and molding additions were essentially the same as those described in Example 4. The following table shows the different bis-imides employed and the results of the flexural tests.

TABLE III

| Sample No. | Bis-imide | Flexural Strength psi |
|---|---|---|
| 1 | N,N'-p,p'-diphenylmethane-bis-tetrahydrophthalimide | 2500 |
| 2 | N,N'-m-phenylene-bis-maleimide | 6500 |
| 3 | N,N'-p,p'-diphenyl ether-bis-maleimide | 9130 |
| 4 | N,N'-p,p'-diphenylsulfone-bis-maleimide | 6900 |

EXAMPLE 13

In the following example, different mono-imides other than the PMI described above, were employed with the BMI. The N-phenyltetrahydrophthalimide was prepared by reacting tetrahydrophthalic anhydride with aniline. The N-phenylnadicimide was prepared by reacting aniline with nadic anhydride (endo-cis-5-norborene-2,3-dicarboxylic anhydride). The following table shows the two different mono-imides employed together with the flexural strengths for each of the samples which were compounded and molded similarly as in Example 4. In each instance, the formulations of Samples 1 and 2 comprised 15 parts of the mono-imide, 15 parts of the bis-imide, 70 parts of asbestos fibers, and 0.3 parts dicumyl peroxide. Reference is made to Example 4 where N-ethylmaleimide was reacted similarly as above.

TABLE IV

| Sample No. | Mono-imide | Flexural Strength psi |
|---|---|---|
| 1 | N-phenyl tetrahydrophthalimide | 6400 |
| 2 | ªN-phenylimide of nadic anhydride | 73000 |

ª Has formula

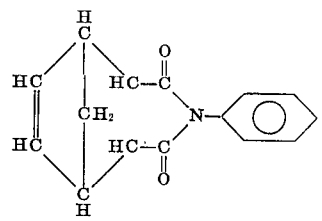

EXAMPLE 14

In this example a mixture of PMI and BMI was milled with an asbestos fiber filler and one percent, by weight, of the mixture of maleimides, dicumyl peroxide, and molded at a temperature of 225°–250°C., for 1.5 to 2 hours at 200° psi. After molding, samples of each molded product were tested for flexural strength. For comparison, a sample was also molded of the PMI above containing one percent, by weight, thereof of dicumyl peroxide and a corresponding amount of asbestos fiber filler. The following table shows the formulations employed in each instance and the flexural strengths of the molded samples.

TABLE V

| Sample No. | Parts PMI | Parts BMI | Parts Filler | Flexural Strength Psi |
|---|---|---|---|---|
| 1 | 10.4 | 14.4 | 79.8 | 8112 |
| 2 | 15.6 | 10.8 | 61.6 | 7200 |
| 3 | 38.0 | 10.9 | 99.5 | 7000 |
| 4 | 38.0 | ---- | 70.0 | 3367 |

EXAMPLE 15

In this example, various combinations of N-substituted mono-imides and BMI were further modified by the incorporation of other imide compositions and to these mixtures were added, asbestos fiber and dicumyl peroxide. In each instance, the mixture of ingredients were compounded and molded similarly as was done in Example 4. The molded samples were then tested for flexural strength and flexural modulus. The following table shows the formulation employed together with the flexural properties of the molded samples.

TABLE VI

| sample No. | parts PMI | Parts BMI | Parts other imide | Asbestos parts | Peroxide parts | Flexural psi | Flexural modulus psi |
|---|---|---|---|---|---|---|---|
| 1 | - | 15 | $^a$15 | 70 | 0.75 | 7300 | 1.78×10$^6$ |
| 2 | - | 15 | $^b$15 | 70 | 0.75 | 8500 | 1.58×10$^6$ |
| 3 | 22.5 | 7.5 | - | 70 | 0.75 | 6000 | 1.6×10$^6$ |
| 4 | 15 | 7.5 | $^c$7.5 | 35 | 0.3 | 10,750 | 2.4×10$^6$ |

$^a$N-phenylimide of nadic anhydride (see Table IV for formula)
$^b$N-phenyltetrahydrophthalimide
$^c$Other imide was N-allylphthalimide; also contained 35 parts chopped glass fibers.

EXAMPLE 16

In this example, the mono-imide and bis-imide of Example 1 were mixed with various polymers and asbestos fibers and after incorporating dicumyl peroxide as curing agent, the mixtures of ingredients were molded similarly as in Example 4 tested for flexural strength. The basic formulation included 18 parts PMI, 6 parts BMI, 70 parts asbestos fibers, 0.24 part dicumyl peroxide, and 6 parts of the specific polymer. The following table shows the various resins which were employed in the aforesaid mixture of ingredients together with the flexural strength of the cured molded products which in each instance were infusible and insoluble.

TABLE VII

| Sample No. | Resin | Flexural Strength psi |
|---|---|---|
| 1 | Bis-phenol-A Polycarbonate | 6628 |
| 2 | Polyethylene | 9030 |
| 3 | Polystyrene | 5570 |
| 4 | Polyvinyl chloride | 8811 |
| 5 | Poly-(xylylene oxide) | 6212 |
| 6 | $^a$Styrene | 7658 |

$^a$This sample was included to show a comparison of using monomeric styrene in the formulation in place of polystyrene in the same quantity.

EXAMPLE 17

In this example, various formulations were made from 6 parts PMI, 1.5 parts BMI, 0.075 part dicumyl peroxide, and 0.83 parts or 2 parts of various resins and, in one instance, monomeric styrene. The mixtures of ingredients were compounded and cast into films and cured similarly as in Example 1. Samples thereof were then tested for cut-through. The following table shows the results of the cut-through tests on each of the films, where in one instance, the resin or styrene constituted 10 percent of the total weight of the ingredients, and in another instance, where the resin or styrene constituted 20 percent of the total weight of the ingredients, excluding in each instance the weight of the dicumyl peroxide.

TABLE VIII

| Sample No. | Resin | °C. Cut-Through 10% | °C. Cut-Through 20% |
|---|---|---|---|
| 1 | Polyvinyl Chloride | | 220 |
| 2 | Polystyrene | 400 | 230 |
| 3 | Bis-phenol-A Polycarbonate | | 370 |
| 4 | Poly-(xylylene oxide) | 375 | 200 |
| 5 | Styrene | 400 | 366 |
| $^a$6 | B-stage phenol-formaldehyde | | 337 |

$^a$This formulation comprised 33 parts PMI, 33 parts BMI, 33 parts of the phenolic resin and 1 part dicumyl peroxide.

EXAMPLE 18

A series of advanced or prepolymerized N-phenyl maleimide and N,N'-p,p'-diphenylmethane-bis-maleimide were prepared by heating each of the maleimides under a nitrogen blanket in a constant temperature bath maintained either at 100°C. or 170°C., employing in some instances oleic acid as a moderator, and in other instances a peroxide in the reaction mixture.

The time for terminating the prepolymerization was taken as the point at which solution of all the ingredients became evident and a viscous liquid material was formed at the temperature at which prepolymerization was carried out. Thereafter, each prepolymerized product (which also included a product made by copolymerizing N-phenyl maleimide with the N,N'-p,p'-diphenylmethane-bis-maleimide) was compounded with a filler, specifically the asbestos fibers, and then further heat treated at a temperature under the same conditions as recited in Example 4. Samples thus molded were tested for flexural strength and flexural modulus. The following Table IX shows the ingredients used to make the prepolymerized products and the properties of the prepolymerized products.

TABLE IX

| sample No. | parts PMI | Parts BMI | Parts Oleic Acid | benzoyl peroxide | temp. °C | Time Seconds | Flow Point °C |
|---|---|---|---|---|---|---|---|
| 1 | 20 | 0 | 0.2 | 0.10 | 100 | 80 | 145 |
| 2 | 20 | 0 | 0.2 | 0.05 | 100 | 3600 | >80 |
| 3 | 20 | 0 | 0.1 | 0.05 | 100 | 310 | >80 |
| 4 | 0 | 20 | 0.2 | - | 170 | 3640 | 160 |
| 5 | 15 | 5 | 0.2 | 0.05 | 100 | 157 | 94 |
| 6 | 20 | 0 | 0 | 0.05 | 100 | 515 | 80 |

EXAMPLE 19

In this example, prepolymerized PMI was prepared by heating the PMI with 0.05 percent, by weight thereof of benzoylperoxide for 12 minutes at 90°C. while stirring. This yielded a viscous material having a flow point of about 90°C. This prepolymerized PMI will hereinafter be identified as PPMI. In addition, prepolymerized BMI was prepared by heating BMI without a peroxide for about 20 minutes at 170°C. to give a highly viscous product which was a solid at room temperature. This product will hereinafter be identified as PBMI. Each of the prepolymerized compositions was mixed with each other or with non-prepolymerized PMI or non-prepolymerized BMI together with an asbestos fiber filler. To each formulation was added 1 percent by weight, dicumyl peroxide, based on the total weight of the polymerizable ingredients. The samples, which were compounded and molded similarly as in Example 4 were then tested for flexural strength and flexural modulus. In one example, the product of prepolymerization of a mixture of PMI and BMI, the preparation of which is shown in Sample No. 5 of Table IX (Example 18) was also milled with filler and peroxide similarly as above and its properties were also determined. An additional example (Sample No. 6)

was compounded from PPMI, BMI and styrene again employing about 1 percent, by weight, dicumyl peroxide, based on the total weight of the three copolymerizable ingredients; in the case of this latter example, no filler was added but instead the mixture was cast onto a solid substrate and the surface was heated gradually and uniformly to 200°C. over a 1-hour period, and the cut-through temperature of this cured film was then determined. This same method was used to obtain cut-through temperatures of unfilled formulations. The following Table X shows the formulations and the results of tests conducted on the cured products therefrom.

TABLE X

| Sample number | Parts PMI | Parts PPMI | Parts BMI | Parts PBMI | Parts filler | Flexural strength, p.s.i. | Flexural modulus $\times 10^6$ p.s.i. | a Cut through, °C. |
|---|---|---|---|---|---|---|---|---|
| 1 | 75 | | 25 | | 70 | 7,000 | 1.6 | 375 |
| 2 | | 75 | 25 | | 70 | 7,100 | 2.0 | 380 |
| 3 | 75 | | | 25 | 70 | 8,010 | 1.73 | 380 |
| 4 | | 75 | | 25 | 70 | 4,947 | 1.04 | 380 |
| 5 | (c) | (c) | (c) | (c) | 70 | 4,230 | 1.65 | |
| b 6 | | | 75 | 25 | | | | 260 | a Cut through was determined on formulations based on Samples 1 to 5, but omitting the filler, and curing similarly as in Sample No. 6.
b Contained 25 parts styrene.
c Prepolymerized mixture of Sample No. 5 of Example 18.

EXAMPLE 20

In this example, the xylenol sulfone ester bis-maleimide of formula XII (obtained by heating 2 moles p-maleimidobenzoyl chloride and 1 mole 2,6-xylenol sulfone of the formula

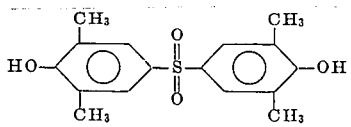

for 6 hours at 155°C. until HCl ceased to evolve) was mixed with PMI in an equal weight ratio and to the mixture was added 3 percent, by weight, benzoyl peroxide, based on the weight of the two maleimides. The liquid mixture thus obtained was cast on a substrate and heated uniformly with increasing temperature from 70° to 250°C. over a period of about 60 minutes. There was thus obtained a cured, thermoset film which was insoluble in methylene chloride.

EXAMPLE 21

In this example PMI alone or PMI and BMI were mixed with asbestos fibers and 1 percent, by weight, dicumyl peroxide based on the weight of the maleimides was added by milling the ingredients at about 70°C. Thereafter each formulation was heated at 165°C. for 5 minutes at about 2,000 psi to give a cured solid product in each instance. Samples of each of the cured materials were then tested for flexural strength and for heat distortion. The following Table XI shows the formulations employed together with the test results on the cured samples.

TABLE XI

| sample No. | parts PMI | Parts BMI | Parts Asbestos Fibers | Flexural psi | Heat Distortion Temp.° C. |
|---|---|---|---|---|---|
| 1 | 30 | - | 70 | 5000 | 190 |
| 2 | 22.5 | 7.5 | 70 | 6000 | <250°C. |
| a 3 | 22.5 | 7.5 | 70 | 5800 | <250°C. | a This molded sample was heated at 250°C. for 333 hours before testing for physicals.

The compositions of the present invention have application in a wide variety of physical shapes and form, including the use as films, molding compounds, coatings, etc. The unusual heat stability and resistance to deformation at elevated temperature, while at the same time retaining their properties at elevated temperatures in the cured state, makes these compositions especially unique. When used as films or when made into molded products, these polymer, including laminated products prepared therefrom, not only possess excellent physical properties at room temperature but they retain their strength and excellent response to work-loading at elevated temperatures for long periods of time. The fact that they have high decomposition points, well above 400°C., and in some instances above 500°C., indicates a wide range of commercial utility for these products. These polymers in particular resist fusion when exposed to temperatures of 400° to 500°C. for extended periods of time while still retaining an exceptionally high proportion of their room temperature physical properties. The ability to make fusible or soluble precursors of the finely cured products makes them especially suitable in the preparation of shaped articles such as films, molded products, etc. whereby using conventional techniques, the mixture of copolymerized ingredients can be converted in situ to the finally cured, infusible and insoluble state.

Films formed from the polymeric compositions of this invention may be used in applications where films have been used previously and in addition films therefrom can be used in applications where films in the past have not been especially suitable. They serve effectively in an extensive variety of wrapping, packaging and bundling applications. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for packaging items to be exposed to high temperatures or to corrosive atmospheres, in corrosion-resistant pipes and duct work, for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures.

Films made from these compositions of matter can serve in printed circuit applications, for instance, as backings by coating the films made from such cured compositions with a thin layer of copper or aluminum either by coating the metal with the curable or heat-convertible compositions herein described and then by heating at elevated temperatures to convert the product to the completely cured state, or by laminating a metal sheet to the cured resinous composition. The circuit design is then covered by a protective coating and the extra metal is etched off followed by washing to prevent further etching. An advantage of making such circuit boards is that the base film is stable to heat so that it can be connected to other components by a dip soldering technique while in contact with the other components without adversely affecting the resinous support base.

Alternatively, solutions of the curable compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Porous films can also be prepared by compounding the compositions of this invention with water-soluble salts, such as sodium benzoate, molding this mixture at elevated temperatures and pressures to form sheets which can be treated with water to leach out the water-soluble salt.

Applications which recommend these resins include their use as binders for asbestos fibers, carbon fibers, and other fibrous materials in making brakelinings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended. So-called resistance or semiconducting paints may also be made from the compositions by incorporating in solutions or dispersions of the curable polymeric mixture, controlled amounts of conducting materials such as carbon, silicon carbide, powdered metal, conducting oxides, etc. in order to impart to the cured paint the particular degree of resistance or semiconduction.

Among the specific applications for which the compositions herein defined may be employed include as finishes for the interiors of ovens, clothing driers, as finishes for cooking utensils, muffler liners, liners for high temperature equipment including liners for hot water heaters, as protective coatings for fragile or brittle substrates such as protective coatings for high temperature bulbs, glass equipment, etc., as flame-retardant paints, as belting for use in high temperature conveyors, etc.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenol-aldehyde resins, urea-aldehyde resins, alkyd resins, etc.; cellulosic material such as paper, inorganic and organic esters of cellulose such as cellulose acetate, cellulose ether; such as methyl cellulose, ethyl cellulose, benzyl cellulose, etc. In some instances, plasticizers and other modifying agents may be used in combination therewith to yield products which when applied to a base member and air dried or baked have a high degree of heat-resistance due to the presence of the compositions herein defined.

It will of course be apparent to those skilled in the art that in addition to the compositions specifically referred to in the foregoing examples, other mono-imides, and bis-imides, many examples of which have been described previously, may be employed without departing from the scope of the invention. The mono-imide or bis-imide employed is not critical and all that is needed are groups corresponding to Formulas V, VI and VII in the imides where R and Q are representative generic monovalent organic radicals and divalent organic radicals, respectively, of broad and non-critical scope.

In addition, other copolymerizable monomers containing at least one

grouping or other resins and polymers, again many examples of which have been given previously, may be used within the scope of the invention. Other peroxides, and cure accelerating agents, as well as ionizing radiation, may be employed, and obviously the conditions of copolymerization and cure may be varied within wide limits.

Processing advantages in making and converting the compositions of the present invention to the thermoset, infusible, insoluble state can often be realized if one employs a diamino compound with the combination of the mono-imide and the bis-imide, many examples of said diamino compounds having been given under Formula III. Persons skilled in the art will have no difficulty in understanding how to use the diamino compounds of formula III, especially in view of Example 5. An additional method which has proved applicable for the purpose involves mixing the mono-imide with the diamino compound and thereafter with the bis-imide and then heating the mixture of ingredients. As a specific instance, 13.8 parts of PMI was mixed with 7.93 parts of 4,4'-diaminodiphenyl methane at about 150°C. under nitrogen atmosphere for about 5 minutes, and thereafter about 36 parts of BMI was added and the heating continued at this temperature for an additional 40 minutes to give a resinous composition which could be heated at 165° C. with about 1 percent, by weight, thereof dicumyl peroxide to give a tough film that did not soften even at temperatures of around 280° C. It will be apparent to those skilled in the art that other diamino compounds can be used with the other mono-imides and bis-imides, including the prepolymerized derivatives thereof, to obtain improved products of a thermoset nature.

What we claim as new and desire to secure by Letters Patent of the United States is:

1. A composition of matter containing as essential ingredients by weight (1) from 5 to 95 percent of a mono-imide of the general formula,

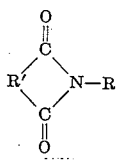

and correspondingly, (2) from 95 to 5 percent of an imide selected from the class consisting of (a) a bis-imide of the general formula,

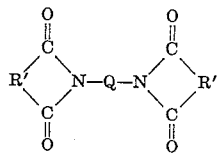

(b) an imide film forming reaction product of at least 1 mole of a bis-imide of the formula

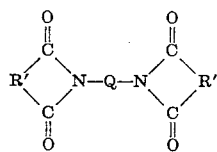

per mol of a diamino compound of the formula $$NH_2—Q—NH_2,$$

and (c) mixtures of (a) and (b), where R is a member selected from the class consisting of hydrogen, and monovalent hydrocarbon radicals, R' is a member selected from the class consisting of

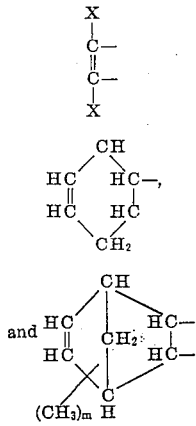

groupings, Q is a member selected from the class consisting of divalent hydrocarbon radicals, and divalent groups consisting of two aryl residues attached to each other through the medium of a member selected from the class consisting of an alkylene radical of from one to 10 carbon atoms, —S—, —SO$_2$—,

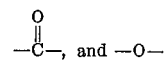

and X is a member selected from the class consisting of hydrogen, and the methyl radical, and $m$ is 0 or 1.

2. A composition as in claim 1 having incorporated therein a small amount of a curing agent.

3. A composition of matter containing as essential ingredients by weight (1) from 5 to 95 percent of a mono-imide of the general formula,

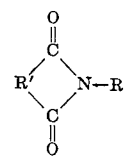

and correspondingly, (2) from 95 to 5 percent of an imide film forming reaction product of a bis-imide of the general formula,

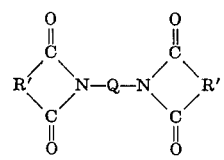

and a diamino compound of the general formula $$NH_2—Q—NH_2$$

wherein the imide film forming reaction product comprises from 1 to 4 mols of the bis-imide per mole of the diamino compound, where R is a member selected from the class consisting of hydrogen and monovalent hydrocarbon radicals, R' is a member selected from the class consisting of

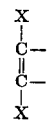

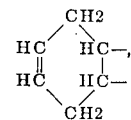

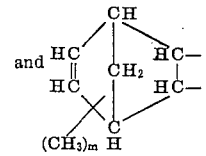

groupings, Q is a member selected from the class consisting of divalent hydrocarbon radicals, and divalent groups consisting of two aryl residues attached to each other through the medium of a member selected from the class consisting of an alkylene radical of from one to 10 carbon atoms,

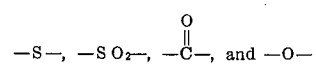

and X is a member selected from the class consisting of hydrogen, and the methyl radial, and m is 0 or 1.

4. A composition of matter containing as essential ingredients by weight (1) from 5 to 95 percent of a mono-imide of the general formula

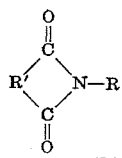

and correspondingly, (2) from 95 to 5 percent of an imide of the general formula,

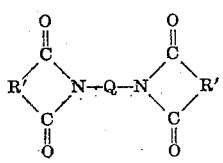

where R is a member selected from the class consisting of hydrogen, and monovalent hydrocarbon radicals, R' is a member selected from the class consisting of

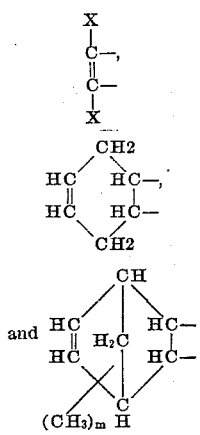

groupings, Q is a member selected from the class consisting of divalent hydrocarbon radicals, and divalent groups consisting of two aryl residues attached to each other through the medium of a member selected from the class consisting of an alkylene radical of from one to 10 carbon atoms,

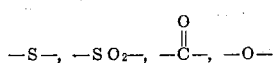

and X is a member selected from the class consisting of hydrogen, and the methyl radical, and m is 0 or 1.

5. A composition containing as essential ingredients by weight (1) up to about 50 percent of a copolymerizable olefin monomer containing a terminal

grouping, and correspondingly (2) at least about 50 percent of said composition of claim 1.

6. A composition of matter containing as essential ingredients by weight (1) from 5 to 95 percent of N-phenyl maleimide and correspondingly (2) from 95 to 5 percent of N,N'-p,p'-diphenyl-methane-bis-maleimide.

7. A composition as in claim 6 wherein an organic peroxide is incorporated in an amount sufficient to effect copolymerization of the ingredients.

8. A heat-reactable composition of matter containing as essential ingredients by weight (1) from 5 to 95 percent N-phenyl maleimide, and correspondingly (2) from 95 to 5 percent of an imide obtained by the reaction of N,N'-p,p'-diphenylmethane-bis-maleimide and 4,4'-diaminodiphenylmethane.

9. A curable composition consisting essentially of the composition of claim 1, and the diamino compound of formula (b) of claim 1.

10. A composition of matter containing as essential ingredients (A) the imide film forming reaction product of a mono-imide of the general formula,

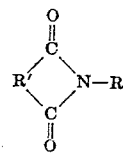

and a diamino compound of the formula $$NH_2-Q-NH_2$$

and (B) a bis-imide of the general formula

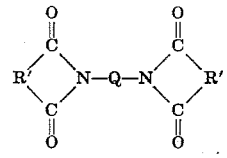

R is a member selected from the class consisting of hydrogen, and mono-valent hydrocarbon radicals, R' is a member selected from the class consisting of

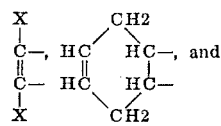

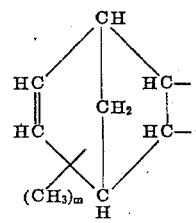

groupings, Q is a member selected from the class consisting of divalent hydrocarbon radicals and divalent groups consisting of two aryl residues attached to each other through the medium of a member selected from the class consisting of an alkylene radical of from one to 10 carbon atoms,

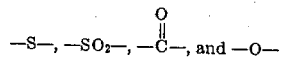

11. A composition as in claim 10 where the mono-imide is N-phenyl maleimide, the diamino compound is 4,4'-diamino diphenyl methane and the bis-imide is N,N'-p,p'-diphenyl methane-bis-maleimide.

12. The fusible reaction product obtained by heating the composition of claim 1 at a temperature in the range of between 75°C to 200°C.

13. The fusible reaction product obtained by heating the composition of claim 4 at a temperature in the range of between 75°C to 200°C.

14. The fusible reaction product obtained by heating the composition of claim 11 at a temperature in the range of 75°C to 200°C.

15. The fusible reaction product obtained by heating the composition of claim 9 to a temperature in the range of 75°C to 200°C.

16. The fusible reaction product obtained by heating the composition of claim 8 to a temperature in the range of 75°C to 200°C.

17. The fusible reaction product obtained by heating at a temperature in the range of between 75°C to 200°C, a composition of matter containing as essential ingredients (1) an imide of the general formula:

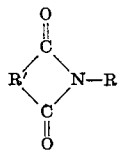

and (2) a bis-imide of the general formula:

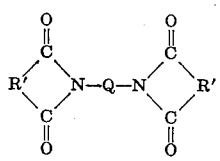

wherein,
R is alkyl or a monovalent radical selected from the group consisting of phenyl, tolyl, and chlorophenyl; R' is

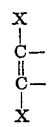

wherein,
X is H or CH$_3$;
Q is a divalent group consisting of two aryl residues attached to each other through the medium of a member selected from the class consisting of alkylene radical of one to 10 carbon atoms and oxygen.

18. The infusible product of reaction obtained by heating the composition of claim 1 to a temperature of at least 165°C.

19. The infusible product obtained by heating the composition of claim 4 to a temperature of at least 165°C.

20. The infusible product obtained by heating the composition of claim 11 to a temperature of at least 165°C.

21. The infusible product obtained by heating the composition of claim 9 to a temperature of at least 165°C.

22. The infusible product obtained by heating the composition of claim 10 to a temperature of at least 165°C.

23. The infusible product obtained by heating the composition of claim 8 to a temperature of at least 165°C.

24. The process which comprises (1) forming a mixture, containing as essential ingredients (a) a mono-imide of the general formula

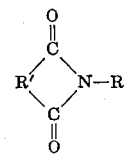

(b) a diamino compound of the formula $$NH_2-Q-NH_2,$$

and (c) a bis-imide of the general formula

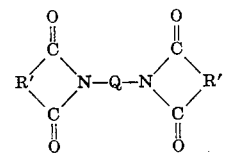

where R is a member selected from the class consisting of hydrogen, and monovalent hydrocarbon radicals, R' is a member selected from the class consisting of

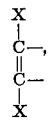

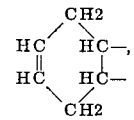

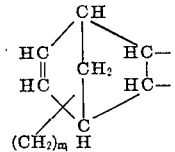

groupings, Q is a member selected from the class consisting of divalent hydrocarbon radicals and divalent groups consisting of two aryl residues attached to each other through the medium of a member selected from the class consisting of an alkylene radical of from 1 to 10 carbon atoms,

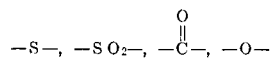

and X is a member selected from the class consisting of hydrogen, and the methyl radical, and m is 0 or 1, and (2) heating the mixture of ingredients at a temperature of from 80°C to 400°C to give a resinous composition which when further heated in the presence of an organic peroxide yields a heat-resistant composition.

25. The process as set forth in claim 24 wherein the diamino compound is first reacted with the mono-imide to form an intermediate reaction product.

26. The process which comprises (1) heating a mixture at a temperature in the range of 80°C to 400°C, which contains as essential ingredients, N-phenyl maleimide and 4,4'-diaminodiphenylmethane, and (2) incorporating N,N'-p,p'-diphenylmethane-bis-maleimide in (1) and (3) heating to a temperature of at least 165°C., the resulting mixture of ingredients to give a product convertible to the infusible state when heated in the presence of an organic peroxide.

27. The process which comprises (A) forming a mixture containing as essential ingredients by weight (1) from 5 to 95 percent of a mono-imide of the general formula

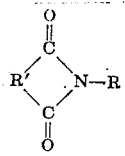

and correspondingly, (2) from 95 to 5 percent of an imide selected from the class consisting of (a) a bis-imide of the general formula

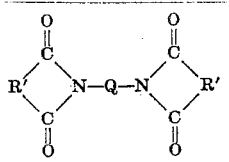

and (b) an imide film forming reaction product of at least 1 mol of an imide of the formula

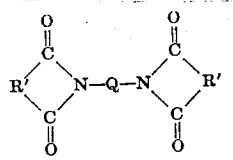

per mol of a diamino compound of the formula

$NH_2-Q-NH_2$, and (c) mixtures of (a) and (b), where R is a member selected from the class consisting of hydrogen, and monovalent hydrocarbon radicals, R' is a member selected from the class consisting of

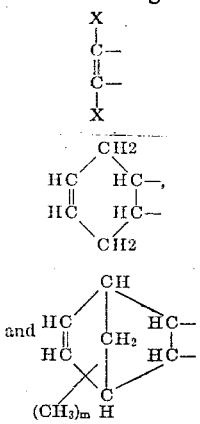

groupings, Q is a member selected from the class consisting of divalent hydrocarbon radicals and divalent groups consisting of two aryl residues attached to each other through the medium of a member selected from the class consisting of an alkylene radical of from one to 10 carbon atoms,

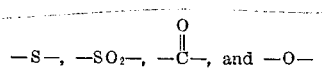

and X is a member selected from the class consisting of hydrogen, and the methyl radical, and $m$ is 0 or 1, and (B) heating the aforesaid mixture of ingredients at a temperature in the range of from 80°C to 400°C and for a time sufficient to convert the mixture to the thermoset state.

28. The process as in claim 27 wherein a source of free radicals is incorporated in the mixture of ingredients in an amount sufficient to accelerate the cure of the mixture of the copolymerizable ingredients.

29. A process as in claim 27 wherein a filler is incorporated prior to the thermal treatment.

* * * * *